April 7, 1959  H. D. STECHER  2,881,241
CABLE SEAL AND SUPPORT
Filed Jan. 6, 1954
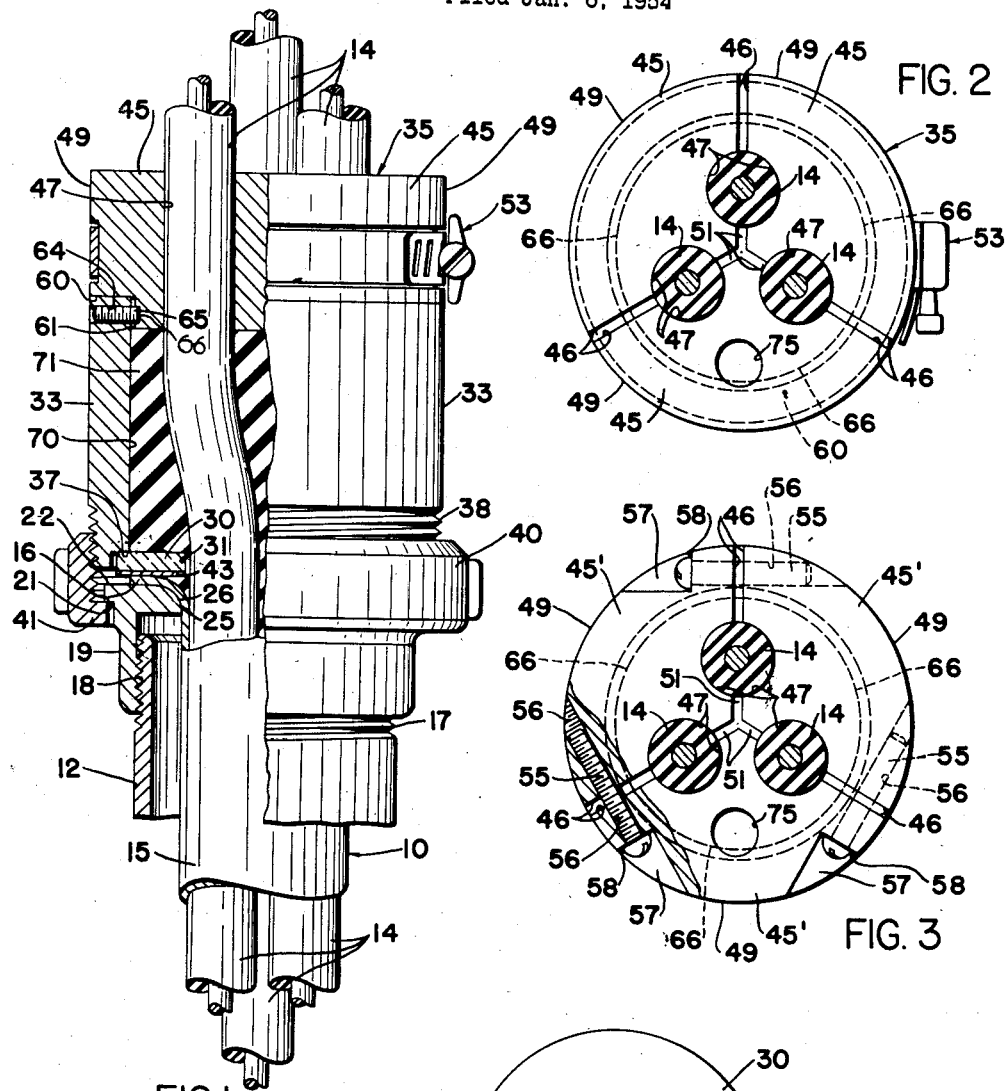
INVENTOR.
HENRY D. STECHER
BY
Bosworth Sessions Herrstein
& Williams
ATTORNEYS

United States Patent Office 2,881,241
Patented Apr. 7, 1959

2,881,241

CABLE SEAL AND SUPPORT

Henry D. Stecher, Cleveland, Ohio, assignor to The Adalet Manufacturing Company, Cleveland, Ohio, a corporation of Ohio Application January 6, 1954, Serial No. 402,468

6 Claims. (Cl. 174—77)

This invention relates to electrical cable supports and more particularly to improvements in supports which grip and seal vertically disposed lead sheathed cables at the point where the conductors extend from the lead sheath for connection to electrical equipments, switchboards, switches and similar electrical installations.

The supporting and sealing of vertically disposed lead covered cable at the end of the lead sheath has been accomplished in the past by wiped lead joints or clamping the belled or flared end of the sheath to a rigid support and disposing a suitable sealing compound over the end of the sheath and around the conductors which extend outwardly therefrom. This system of clamping and sealing cable ends is unsatisfactory for several reasons. While the lead sheath is positively supported, the cable conductors inside the sheath and extending beyond it are not; the weight of the conductors being carried entirely by the clamped or joined end portion of the sheath. Such loading of the soft ductile sheath causes undue concentration of stresses at the clamped or joined end thereof, especially with long lengths of vertically disposed cable, which tend to stretch, split and even destroy the sheath end. The exposed or unsheathed extensions of the conductors which are connected to the terminals of the particular installations often expand and contract as a result of ambient temperatures and resistance heating of the conductors. Since the exposed conductors are unsupported, such expansion and contraction tends to crack the sealing compound at the end of the sheath and impairs or even destroys the seal. My invention is directed to a novel lead sheathed cable support and seal assembly which overcomes the enumerated deficiencies in cable supports of the past.

An object of the present invention is to provide a dual cable support for the end of vertically disposed lead sheathed cable in which the weight of the cable conductors is supported independently of the sheath. Another object is the provision of a support and seal assembly for the end of vertically disposed lead sheathed cable in which relative movement between the conductors on one hand and the sheath and sealing compound on the other hand is prevented, thereby preserving the seal against adverse effects of expansion and contraction of the cable parts. Another object is the provision of a compact sturdy support for vertically disposed lead sheathed cable which may be connected quickly and easily to the cable without the use of special tools or special skills. Another object is the provision of a support for vertically disposed lead cable in which each conductor of a multi-conductor cable is individually gripped and supported over a large area of the periphery thereof thereby affording a tight non-slip grip with low unit forces. Another object is the provision of a support and seal assembly in which the seal is protected from damage by falling objects and the like which is likely to occur when the assembly is located at floor level.

These and other objects of my invention will become apparent from the following description of a preferred embodiment thereof, reference being had to the accompanying drawings.

Figure 1 is an elevation partly in section showing the cable support and seal unit embodying my invention and completely assembled and mounted on a lead sheathed cable.

Figure 2 is a top plan view of the assembled support unit of Figure 1 showing the arrangement of the conductor gripping parts.

Figure 3 is a plan view of a modified form of conductor gripping parts showing alternate clamping means for contracting the parts on the cable conductors.

Figure 4 is a plan view of the sheath end clamping plate.

The transmission of electricity between floors or different levels in multi-storied commercial and industrial buildings, power plants, sub-stations and the like conventionally is accomplished by means of lead covered cables whose conductors at the ends of the cables are unsheathed or exposed and extend from the sheaths for connection to switch boards, switches or other power installations. The heights which the vertical reaches of such cables span are often considerable and as a result the weights of the components of the cable, that is, the lead sheath and the conductors, are proportionately large. My invention is concerned with a novel cable support and seal for rigidly supporting and sealing both the conductors and the lead sheath at the point where the conductors extend from the end of the sheath for connection to the desired installation. In illustrating the utility and purpose of my invention, I have shown and described below a cable which is disposed to be electrically connected to a particular installation at the upper end of the cable although it will be understood that the advantages of my invention may be realized equally well when applied to cable disposed in other positions.

Referring now to the drawings, there is illustrated in Figure 1 a preferred embodiment of my invention in which the upper end of a multi-conductor lead covered cable 10 is enclosed in and projects from the upper end of a rigid conduit 12 which is securely supported in a fixed vertical position in any suitable manner. The cable 10 is of well known construction and comprises one or more, three being shown, insulated electrical conductors 14 closely confined within a lead covering or sheath 15 whose upper end 16 is spaced upwardly from the end of conduit 12 and is flared or belled outwardly from the conductors 14 as shown. The exposed or unsheathed conductors extend upwardly from the end of the lead sheath for connection to the terminals of the desired electrical installation and are spaced apart from each other to facilitate this connection.

The upper end of the rigid conduit 12 is formed with an external thread 17 to which the lower internally threaded end 18 of a fitting 19 is adapted to be secured. The upper portion of the fitting 19 extends beyond the end of the conduit 12 and has an external annular downwardly facing shoulder 21 adjacent the top surface 22 of the fitting. Fitting 19 has a central opening 25 for receiving the lead sheath 15 of cable 10, the diameter of the lower portion of opening 25 preferably being substantially the same as the outside diameter of the lead sheath 15 so that the fitting 19 closely embraces the periphery of the sheathed cable when fitted thereon. The inner surface of the fitting which defines the central opening 25 curves or flares uniformly upwardly and outwardly as indicated at 26 into the plane of the fitting top surface 22 substantially normal to the axis of the cable. I prefer that the annular width of the top surface 22 of fitting 19 be substantial in order to provide support for a relatively large area of the end portion of the sheath. The flare 26 on the inner surface of the fitting facilitates uniform curving or bending of the sheath end preparatory to clamping it and additionally eliminates concentration of stresses in this part of the sheath. The end of the sheath when flared lies flat on the top surface 22 of the fitting, and is in position to be clamped as explained below.

The exposed cable conductors 14 above the flared end of the lead sheath 15 pass through an upper sheath clamp plate 30, see Figure 4, which is formed with a central opening 31 to receive the conductors, and continue upwardly through the interior of a preferably cylindrical open ended hollow body member or sleeve 33 and are clamped in a segmented conductor gripping assembly 35 at the upper end of the sleeve 33. The internal diameter of sleeve 33 is slightly less than the external diameter of the clamp plate 30 and is recessed on its lower end to provide an inner shoulder 37 which engages the top outer marginal edge portion of the clamp plate. The lower end of sleeve 33 also has external threads 38 formed thereon which are engaged by an internally threaded clamping ring 40 for securing the sleeve to the fitting 19. To this end, clamping ring 40 has an annular inwardly extending flange 41 which engages under the external shoulder 21 on the fitting for holding the sleeve to the fitting. When clamping ring 40 is tightened, sleeve 33 is drawn down toward the fitting, and plate 30 by engagement with the shoulder 37 on the sleeve is pressed tightly against the flat marginal edge portion of the sheath which is thereby tightly clamped. A gasket 43 between the clamp plate 30 and the flared part of the sheath seals this connection. Thus the end of the sheath as well as the sleeve 33 is firmly clamped and rigidly supported on the conduit 12.

The conductor gripping assembly 35 comprises one or more, usually three as shown, substantially identical conductor gripping elements or segments 45 adapted to fit closely around the individual conductors and to overlie the top surface of the sleeve 33 so as to substantially close or cover the upper end of the sleeve. The circumferential radially extending end surfaces 46 of these elements are each formed with approximately a half-round recess 47 which, together with a corresponding recess in the juxtaposed end surface of the adjacent element, defines a right-cylindrical hole extending vertically through the elements, which hole is adapted to receive one of the insulated conductors when the elements are fitted together in a pre-operative position. The external surfaces 49 of the elements 45 preferably are right cylindrically shaped of diameter equal to the outside diameter of the sleeve 33 and are coaxial of the axis of sleeve when arranged in the pre-operative position.

With the elements 45 assembled together as shown in Figures 1 and 2, the circumferential end surfaces 46 of the elements will be juxtaposed and spaced apart to form gaps 51 when surfaces of recesses 47 initially engage the external covering of the conductors 14. Thereafter a circumferential clamp band 53, such as a "Breeze" clamp as shown, is fastened circumferentially around the elements. When clamp band 53 is tightened, the several elements 45 are drawn radially inwardly toward each other so that the spacings between gaps 51 are narrowed and the individual conductors are tightly and securely gripped over substantially their entire peripheral surfaces within recesses 47. An alternate means for drawing elements 45' together is shown in Figure 3 and consists of screws 55 which engage in tapped holes 56 whose axes are normal to the planes of the respective end surfaces 46 of the elements. The outer surfaces of the elements are recessed at 57 to provide an abutment or shoulder 58 for each screw head. When the screws are tightened, the elements are drawn together on the cable conductors and securely grip them in the manner described above.

The lower outer end portion of each element 45 is recessed to provide a seat comprising a flat radial annular surface 60 and adjacent right cylindrical surface 61 having a diameter slightly less than the internal diameter of sleeve 33. Surfaces 60 and 61 on the elements form a continuous circumferential seat by which the elements are fitted to and rest directly on the top of sleeve 33. In order to lock the several clamped elements 45 as a unit on the end of the sleeve, radially tapped holes 64 corresponding in number to the number of elements used are formed at equally spaced intervals in the upper end of the wall of the sleeve 33. Set screws 65 extend through these tapped holes and engage in annular grooves 66 formed in the cylindrical seating surfaces 61 of the assembled elements 45. The cable gripping surfaces 47 in the elements 45 are formed on centers sufficiently spaced apart to provide adequate spacing of the gripped conductors whereby to facilitate individual handling of each conductor above the support assembly.

In order to seal the conductors at the point where they emerge from the lead sheath and to exclude air and moisture from between the conductors as well as to prevent ingress of moisture or air into the sheathed cable, the pocket or cavity 70 within the sleeve 33 between the sheath clamp plate 30 and the conductor gripping elements 45 is filled with a moisture impervious sealing compound 71 such as heat softened petroleum compounds or other suitable compounds which thereafter sets and hardens in the cavity. The sealing compound 71 in the cavity completely surrounds the exposed conductors and effectively seals the opening 31 in clamp plate 30, the gaps 46 between gripping elements 45, and any spaces between the conductor gripping surfaces 47 of elements 45 and the peripheries of the conductors. That is to say, the sealing compound completely seals the conductors within cavity 70 and closes and seals the top of the lead sheathed cable. In practice, I prefer to introduce the sealing compound into the cavity 70 after the gripping elements 45 have been secured to the end of the sleeve 33 and tightened on the conductors so that the conductors are held firm in the final supported position when the compound hardens around them. To this end, a filling hole 75 is formed in one of the elements 45, see Figures 2 and 3, through which the sealing compound is introduced into the cavity 70 as a final step in the assembly of the cable grip and seal unit. Alternatively, such filling hole could be located in the side of sleeve 33, if desired.

In assembling the cable end grip and sealing unit with the lead covered cable on the end of the vertically disposed rigid conduit 12, fitting 19 together with coupling ring 40 interlocked therewith is passed over the end of the cable before the lead sheath is stripped therefrom and is screwed tightly on the end of conduit 12. The lead sheath 15 is then cut at a point spaced slightly above the top surface 22 of the connected fitting and the severed portion of the sheath is removed from the upper part of the cable thereby exposing the upper end portions of conductors 14. The top of the sheath next is peeled away from the cable and is bent or flared outwardly around the curved inner surface 26 of the fitting 19 until the outer end of the sheath lies smoothly across the annular top surface 22 of the fitting. Gasket 43, clamp plate 30 and the sleeve 33 are then fitted over the end of the exposed conductors and coupling ring 40, after engaging the lower threaded end of the sleeve is rotated to draw the clamp plate and gasket tightly down on the flared sheath end to securely clamp same to the fitting. The sheath is thus securely held and supported on the rigid conduit.

With the sheath clamped and the sleeve 33 secured to the conduit, the conductor gripping elements 45 are next fitted around the conductors in a pre-operational position on the upper end of the body member with the surfaces 47 of the elements snugly engaging the conductors which previously had been spread apart slightly to facilitate this assembly operation. The gripping elements 45 are seated firmly on the upper end of the body member and thereafter clamp 53 (or screws 55, see Figure 3) is tightened to draw the elements together around the conductors and into tight gripping relation with them. It will be noted that substantially the whole peripheral area of the portion of each insulated conductor enclosed by the gripping elements is uniformly constricted by this clamping action so that the greatest grip of and support for the insulated conductors is attained with the least unit pressure between the elements and the conductors with the least hazard of rupturing the conductor insulation or impairing same in any way incident to the support of the conductors. Thus the clamp may be tightened without special tools and with comparatively little effort. After the conductors have been securely gripped by the elements 45, set screws 61 are tightened and the several elements as a unit are secured in fixed position on the end of the sleeve 33. The sealing compound 70 is next introduced into the cavity in the sleeve to fill same and thoroughly seal the end of the sheathed cable. The assembly is then complete.

It will be noted that the conductor gripping elements in the assembled unit are seated on the end of the sleeve 33 and that the weight of the conductors both above and below the gripping elements is supported through the sleeve on the rigid conduit 12. The conductors and the lead sheath are thus separately supported on the rigid conduit. This dual grip on the cable parts not only affords greater support for the cable but also preserves the original structure of the cable by maintaining the conductors in a longitudinally fixed position within the lead sheath. With each cable component—the sheath and the conductors—supported independently of the other, undue load bearing strain on either is avoided. Moreover, the terminals to which the free ends of the conductors are connected are not subjected to mechanical loads due to the weight of the cable.

Another important feature of this construction is that the exposed insulated conductors and the end of the sheath are each supported immediately adjacent the sealing medium, and, in the preferred embodiment illustrated and described herein, on opposite ends of the seal medium. Relative movement between the conductors and the support assembly in either longitudinal or lateral directions that might tend to crack and break the hardened sealing compound is prevented and the seal is thus preserved. The body of the sealing compound is substantially entirely enclosed in the cavity 70 by the sleeve 33 and the conductor gripping elements 45 and is thus fully protected from damage by falling objects and the like. Any pulling, twisting or bending of the free upper end portions of the exposed conductors incident to connecting same to a particular electrical installation is not transmitted to the seal by reason of the manner in which these conductors are independently gripped and supported by the elements 45. In gross, the sealing compound is substantially completely insulated from shocks, stresses and strains that might otherwise impair or even destroy the seal.

In the above description and in the drawings of a preferred embodiment of my invention, the sheath and conductors of the cable are supported on the end of the rigid conduit 12. However, my invention may be practiced and the utility and novel advantages thereof realized in other installations wherein the fitting 19 is connected to or rigidly supported on adjacent structures other than the rigid conduit, such as, for example, a floor or wall structure through which the cable passes. That is to say, the rigid conduit 12 is illustrated and described as one means of supporting the cable gripping and sealing assembly embodying my invention, but my invention is not limited to or dependent upon this one form of support but may be practiced with advantage in installations where rigid conduit is not used and where other suitable means of firmly and rigidly supporting the fitting 19 are employed.

While I have illustrated and described a preferred form and embodiment of my invention, changes, adaptations and improvements therein and thereon will occur to those skilled in the art who come to understand the purposes and advantages of my invention. Therefore, I do not care to be limited in the scope and effect of my patent to the specific form and embodiment of my invention herein disclosed by way of illustration and example, nor limited in any other manner inconsistent with the advance in and promotion of the art achieved by my invention.

I claim:

1. A support and seal assembly for lead sheathed multi-conductor cable in a vertically disposed rigid conduit, the lead sheath being stripped from one end of the cable and exposing the cable conductors for a limited portion of their length, comprising a fitting secured to the end of said conduit having a sheath supporting ring portion formed thereon, the end of said sheath being flared and overlying the top of said ring portion of said fitting, a clamp plate having a central opening and overlying the flared end of the sheath, the exposed cable conductors extending upwardly from the end of the sheath through said opening in said plate, a sleeve surrounding the exposed conductors and having its lower edge spaced from said fitting and overlying the upper marginal edge of said plate, means for drawing said sleeve toward said fitting whereby the end of said sheath is clamped between said plate and said fitting, a plurality of juxtaposed diametrically contractible conductor gripping and supporting elements positively supported on and longitudinally fixed relative to the upper end of said sleeve and having a plurality of vertically extending cylindrical openings therein for receiving the exposed conductors, respectively, means for diametrically contracting said elements independent of longitudinal movement into tight gripping and load bearing engagement with said conductors, and a sealing compound completely filling the space around the exposed conductors within said sleeve between said flared sheath and said gripping elements.

2. A support and sealing assembly for lead covered cable, said assembly being adapted to support and seal the end of the lead covering and the exposed insulated cable conductors which extend beyond said end of the lead covering, comprising, a fitting disposed around the cable adjacent said end of the covering, means for supporting said fitting, clamping means for securing said end of said covering to said fitting, a sleeve surrounding said exposed insulated conductors for a portion of their length adjacent said end of the covering, means for supporting said sleeve, a diametrically contractible conductor supporting and gripping unit supported and positively secured against longitudinal movement on the end of said sleeve remote from said end of the covering and having openings therein through which said exposed insulated conductors extend, means for diametrically contracting independently of longitudinal movement said gripping unit into tight load bearing engagement with said conductors, and a sealing medium disposed within said sleeve to surround said exposed conductors below said gripping unit whereby to seal the end of the covered portion of said cable.

3. The assembly according to claim 2 in which said gripping unit comprises a plurality of identical substantially rigid elements having juxtaposed end surfaces spaced apart slightly, said end surfaces having opposed arcuately formed axially extending surfaces defining said openings and unyieldingly and positively gripping the peripheries of said conductors.

4. A support and seal assembly for substantially vertically disposed sheathed cable, said cable comprising at least one insulated conductor, the sheath for said cable enclosing a substantial portion of the length of said conductor and terminating at a point spaced from the end of the conductor, comprising, means for clamping and rigidly supporting the end of said sheath, a sleeve disposed adjacent the end of said sheath and enclosing a portion of the conductor extending beyond the sheath, means for supporting said sleeve in fixed position relative to said sheath clamping and supporting means, substantially rigid, diametrically contractible conductor gripping means engaging and unyieldingly gripping independently of longitudinal movement said conductor at a point spaced from the end of the sheath, said conductor gripping means being positively supported and secured against longitudinal movement in either direction on said sleeve whereby the full weight of the vertical length of the sheathed and unsheathed portions of said insulated conductor is carried through said gripping means and by said sleeve, and sealing means filling the space within said sleeve below the cable gripping means for sealing the end of the covered cable.

5. Mechanism for supporting and sealing the end portion of sheathed cable, the sheath for the cable terminating short of the ends of the cable conductors, comprising, means for clamping and supporting the end of the sheath, diametrically contractible conductor gripping means for tightly and unyieldingly gripping independently of longitudinal movement the unsheathed insulated conductors at a point intermediate the clamped end of the sheath and the end of the conductors, means for positively supporting and securing against longitudinal movement in either direction said conductor gripping means independently of said sheath whereby to support said conductors, and sealing means for sealing the end of the sheathed portion of said cable.

6. Mechanism for supporting and sealing the end portion of sheathed cable, the sheath for the cable terminating short of the ends of the cable conductors, comprising means for supporting the end of the sheath, sealing means for sealing the end of the sheathed portion of the cable, and diametrically contractible conductor gripping means for tightly and unyieldingly gripping independently of longitudinal movement the unsheathed insulated conductors at a point spaced from the end of the sheath and for supporting said conductors independently of the sheath and sealing means.

References Cited in the file of this patent

UNITED STATES PATENTS

| | | |
|---|---|---|
| 1,118,035 | Meschenmoser | Nov. 24, 1914 |
| 1,851,940 | Williams | Mar. 29, 1932 |
| 2,024,862 | Hooley | Dec. 17, 1935 |
| 2,168,591 | Tschappat | Aug. 8, 1938 |
| 2,247,671 | Tepel | July 1, 1941 |